(12) United States Patent
Hart et al.

(10) Patent No.: US 10,940,569 B2
(45) Date of Patent: Mar. 9, 2021

(54) MITER SAW

(71) Applicant: TTI (MACAO COMMERCIAL OFFSHORE) LIMITED, Macau (MO)

(72) Inventors: Michael Hart, Anderson, SC (US); Sumithra Janardhanan, Saratoga, CA (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 16/437,482

(22) Filed: Jun. 11, 2019

(65) Prior Publication Data
US 2019/0375060 A1  Dec. 12, 2019

Related U.S. Application Data

(60) Provisional application No. 62/683,730, filed on Jun. 12, 2018.

(51) Int. Cl.
*B23D 45/04* (2006.01)
*B23Q 3/00* (2006.01)

(52) U.S. Cl.
CPC .......... *B23Q 3/005* (2013.01); *B23D 45/044* (2013.01); *Y10T 83/7593* (2015.04); *Y10T 83/7607* (2015.04); *Y10T 83/7613* (2015.04)

(58) Field of Classification Search
CPC .............. Y10T 83/727; Y10T 83/7593; Y10T 83/7607; Y10T 83/7613; Y10T 83/762;
(Continued)

(56) References Cited

U.S. PATENT DOCUMENTS 585,366 A    6/1897 Streit
5,297,463 A  3/1994 O'Banion et al.
(Continued)

FOREIGN PATENT DOCUMENTS

CA    2302032 A1    1/2001
CA    2542248 A1   10/2006
(Continued)

OTHER PUBLICATIONS

European Patent Office Extended Search Report for Application No. 19179640.8 dated Oct. 18, 2019 (9 pages).

*Primary Examiner* — Phong H Nguyen
(74) *Attorney, Agent, or Firm* — Michael Best & Friedrich LLP

(57) ABSTRACT

A miter saw includes a fence assembly having a first fence fixedly coupled to a base of the miter saw. The fence assembly includes a moveable fence having a lower portion slidably received within a channel at least partially defined by the first fence. The fence assembly includes a locking member coupled to the first fence. The locking member extends into a groove defined by the lower portion of the moveable fence. The locking member is configured to engage the lower portion of the moveable fence to selectively lock the moveable fence between a retracted position and an extended position relative to the first fence. The fence assembly includes a retaining member coupled to the first fence and extending into the groove of the moveable fence. The locking member and the retaining member collectively restrict the moveable fence from moving in a direction away from the horizontal workpiece support surfaces.

20 Claims, 9 Drawing Sheets

(58) Field of Classification Search
CPC ............. Y10T 83/7627; Y10T 83/7633; Y10T 83/764; Y10T 83/7647; Y10T 83/7684; Y10T 83/7693; Y10T 83/7697; Y10T 83/7701; Y10T 83/7705; Y10T 83/8773; B23Q 3/005; B23D 45/044; B23D 45/14; B23D 45/02; B23D 45/021; B23D 45/024; B23D 45/025; B23D 45/04; B23D 45/042; B23D 45/046; B23D 45/048; B26D 7/02; B26D 7/01; B27B 27/00; B27B 27/04; B27B 27/06; B27B 27/08; B27B 27/10

See application file for complete search history.

(56) References Cited

U.S. PATENT DOCUMENTS

| | | | |
|---|---|---|---|
| 5,752,422 A | 5/1998 | Inoue et al. | |
| 5,755,148 A * | 5/1998 | Stumpf | B27B 27/00 83/468.2 |
| 5,855,366 A | 1/1999 | Chang | |
| 6,763,751 B2 | 7/2004 | Judge | |
| 6,994,007 B2 | 2/2006 | Kenyon et al. | |
| 7,044,041 B1 | 5/2006 | Chalkowsky | |
| 7,252,027 B2 | 8/2007 | Meredith et al. | |
| 7,575,593 B2 | 8/2009 | Rea et al. | |
| 7,617,755 B2 | 11/2009 | Bean et al. | |
| 7,770,501 B2 | 8/2010 | Ozawa et al. | |
| 7,819,044 B2 | 10/2010 | Meredith | |
| 7,950,317 B2 | 5/2011 | Parks et al. | |
| 8,250,956 B2 | 8/2012 | Cox et al. | |
| 8,266,996 B2 | 9/2012 | Thomas et al. | |
| 8,272,304 B2 | 9/2012 | Lawlor et al. | |
| 8,621,970 B2 | 1/2014 | Lawlor et al. | |
| 9,616,587 B2 | 4/2017 | Xu et al. | |
| 9,833,924 B2 | 12/2017 | Gehret et al. | |
| 2006/0005677 A1 | 1/2006 | Lambert et al. | |
| 2006/0236833 A1* | 10/2006 | Meredith | B27B 27/04 83/471.3 |
| 2007/0214926 A1 | 9/2007 | Ceroll et al. | |
| 2008/0022824 A1* | 1/2008 | Chang | B27B 27/06 83/471 |
| 2009/0095141 A1 | 4/2009 | Billings et al. | |
| 2009/0235797 A1* | 9/2009 | Kani | B27B 27/08 83/477 |
| 2010/0018372 A1 | 1/2010 | Thomas et al. | |
| 2010/0043614 A1* | 2/2010 | Gehret | B27B 27/10 83/471.3 |
| 2012/0167783 A1 | 7/2012 | Lawlor et al. | |
| 2014/0116221 A1 | 5/2014 | Lawlor et al. | |
| 2018/0354154 A1* | 12/2018 | Dutterer | B23D 45/024 |

FOREIGN PATENT DOCUMENTS

| | | |
|---|---|---|
| CA | 2960717 A1 | 3/2016 |
| EP | 2103400 A2 | 9/2009 |
| EP | 3246121 A1 | 11/2017 |
| EP | 3246132 A1 | 11/2017 |
| MX | 2017003208 A | 7/2017 |
| WO | 2015098615 A1 | 7/2015 |
| WO | 2017087447 A1 | 5/2017 |

* cited by examiner

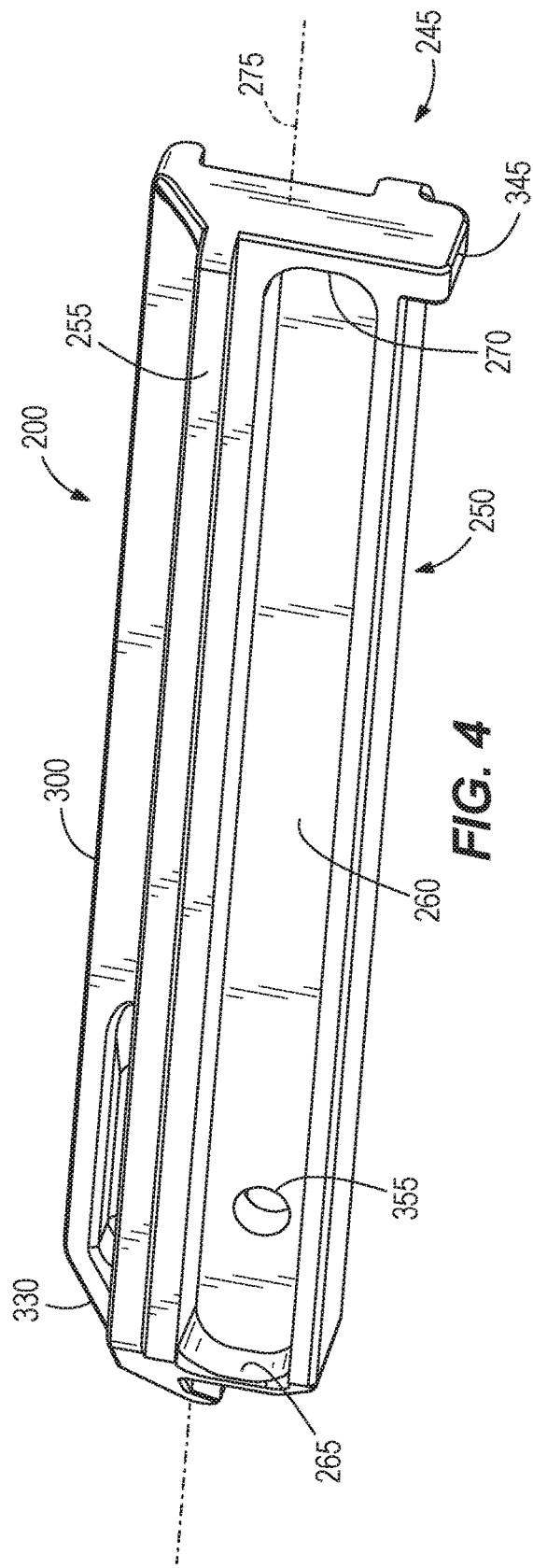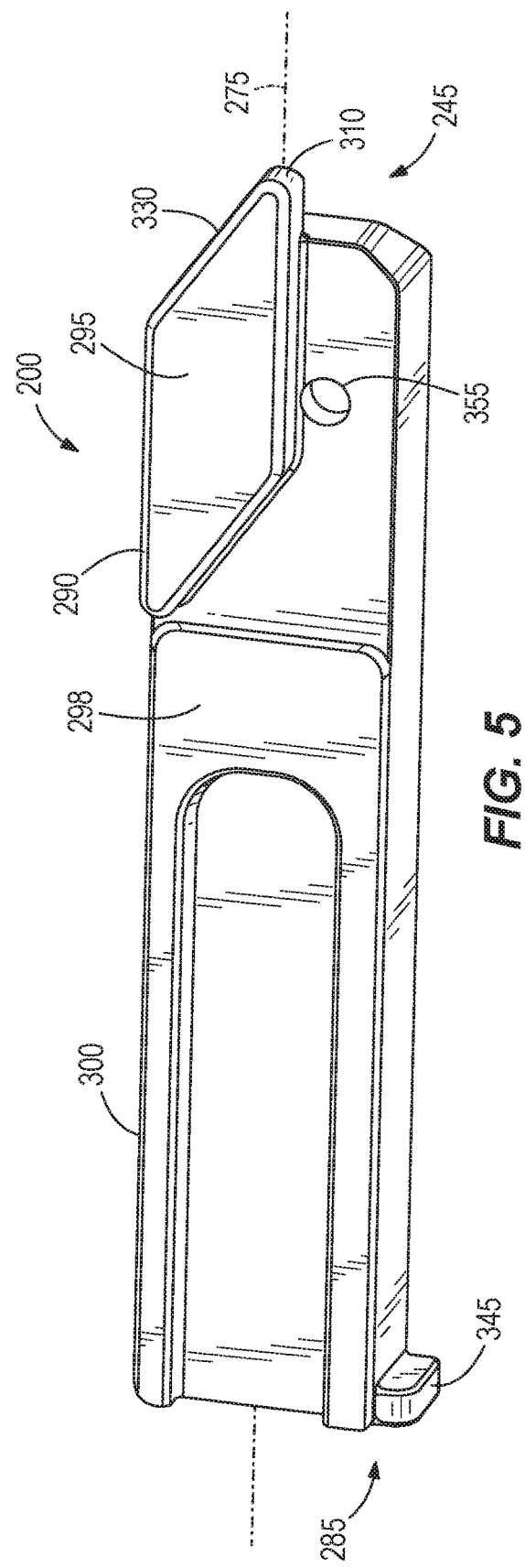

MITER SAW

CROSS-REFERENCE TO RELATED APPLICATIONS

This application claims priority to U.S. Provisional Patent Application No. 62/683,730 filed on Jun. 12, 2018, the entire content of which is incorporated herein by reference.

FIELD OF THE INVENTION

The present invention relates to power tools, and more particularly to miter saws.

SUMMARY OF THE INVENTION

The invention provides, in one aspect, a miter saw including a base and a turntable pivotably coupled to the base about a vertical miter axis. The turntable and the base include horizontal workpiece support surfaces configured to support a workpiece on the miter saw. The miter saw also includes a fence assembly having a first fence fixedly coupled to the base. The first fence includes a wall having a vertical workpiece support surface. The fence assembly also includes a moveable fence having a lower portion slidably received within a channel at least partially defined by the first fence. The moveable fence includes a protrusion having a surface coplanar with the vertical workpiece support surface. The surface of the moveable fence and the vertical workpiece support surface are configured to abut the workpiece supported on the horizontal workpiece support surfaces. The fence assembly further includes a locking member coupled to the first fence. The locking member extends into a groove defined by the lower portion of the moveable fence. The locking member is configured to engage the lower portion of the moveable fence to selectively lock the moveable fence between a retracted position and an extended position relative to the first fence. The fence assembly includes a retaining member coupled to the first fence and extending into the groove of the moveable fence. The locking member and the retaining member collectively restrict the moveable fence from moving in a direction away from the horizontal workpiece support surfaces.

Other features and aspects of the invention will become apparent by consideration of the following detailed description and accompanying drawings.

BRIEF DESCRIPTION OF THE DRAWINGS

FIG. 4 is a rear perspective view of the moveable fence of FIG. 3.

FIG. 5 is a front perspective view of the moveable fence of FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Terms of degree, such as "substantially" or "approximately" are understood by those of ordinary skill to refer to reasonable ranges outside of the given value, for example, general tolerances associated with manufacturing, assembly, and use of the described embodiments.

DETAILED DESCRIPTION

Figure 1:
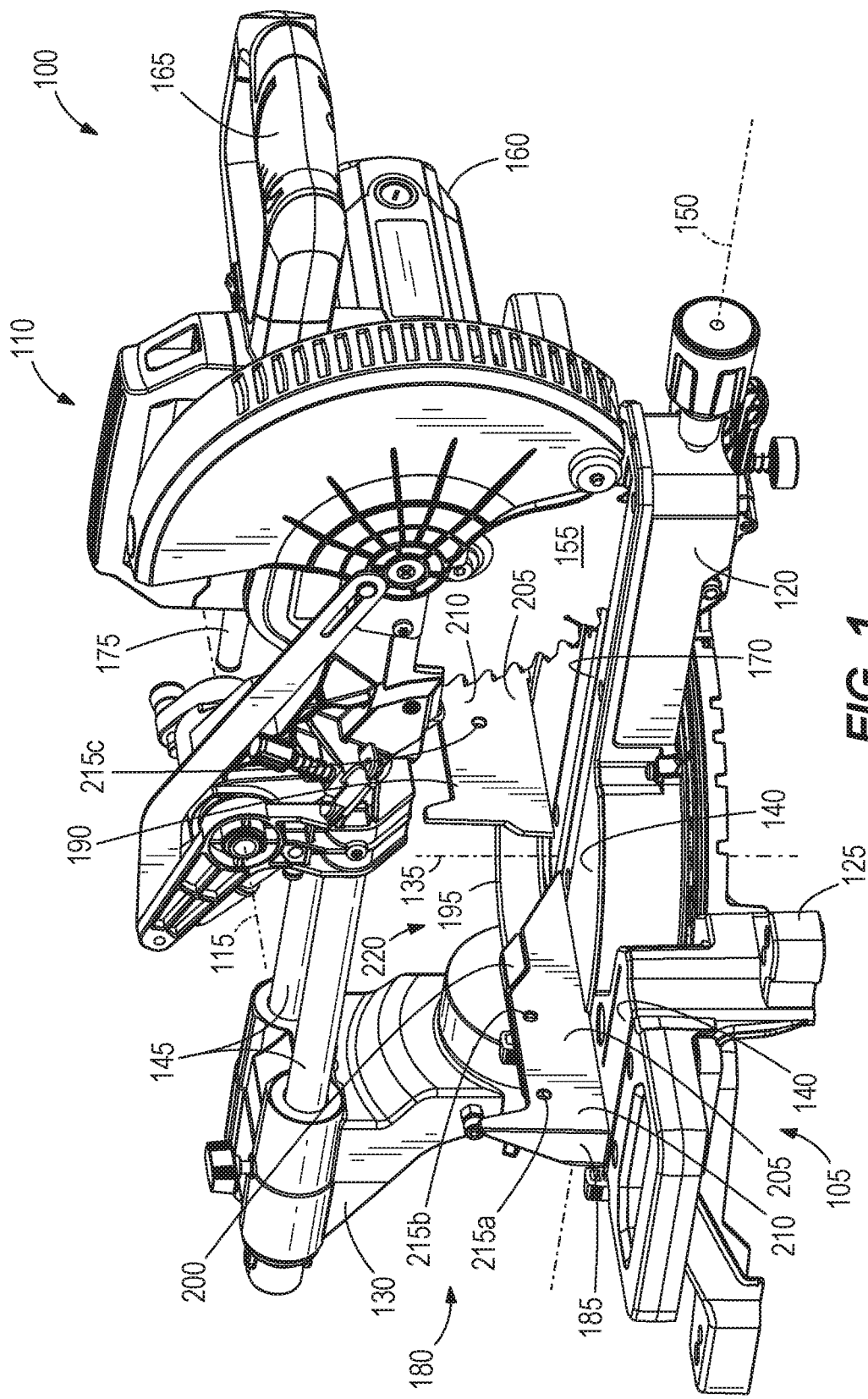
FIG. 1 is a front perspective view of a miter saw including a fence assembly according to one embodiment of the invention.
Figure 2:
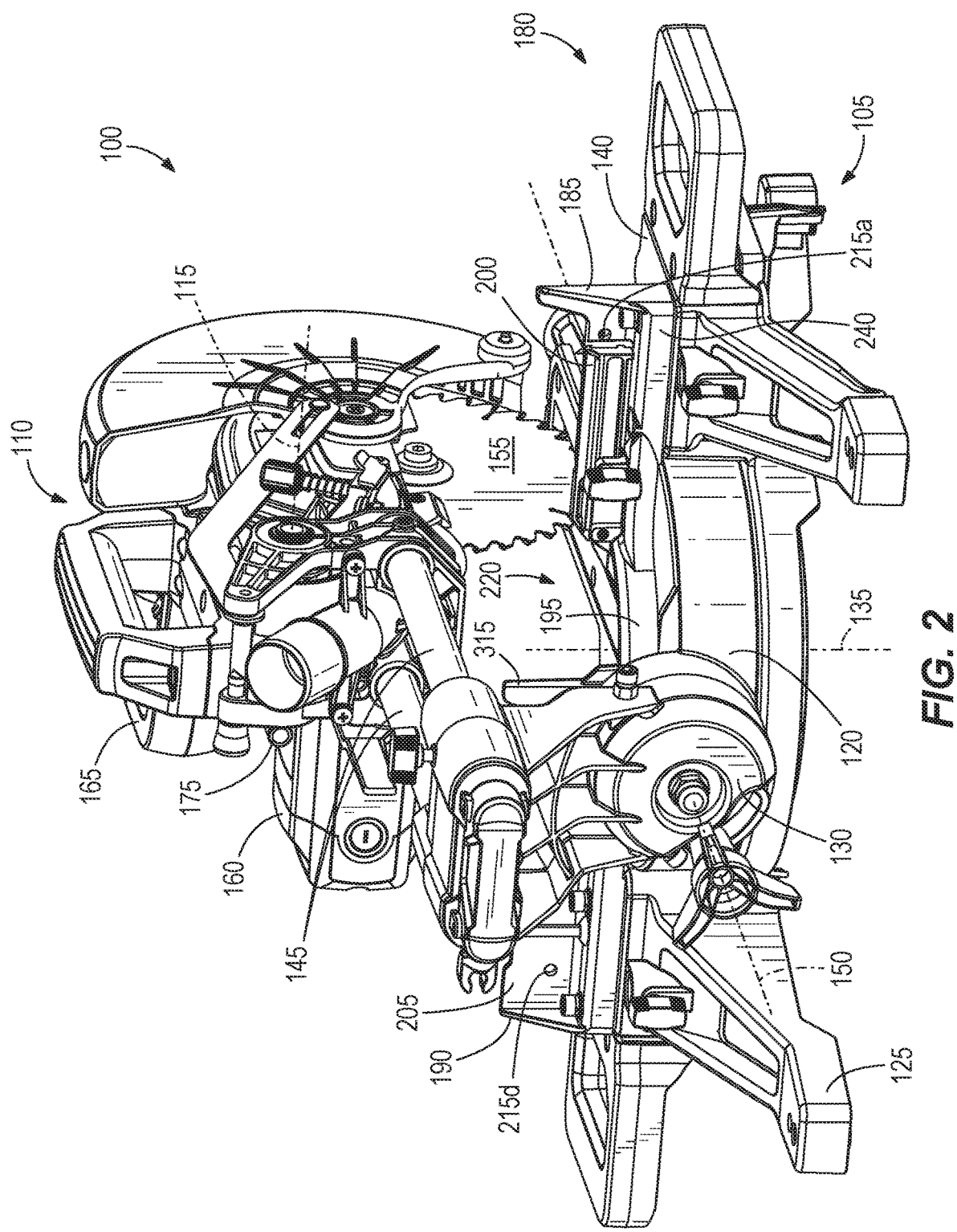
FIG. 2 is a rear perspective view of the miter saw of FIG. 1.

With reference to FIGS. 1 and 2, a power tool (i.e., a miter saw 100) includes a base assembly 105 and a saw unit 110 pivotably coupled to the base assembly 105 about a first or "chopping" axis 115. The illustrated base assembly 105 includes a turntable 120, a base 125, and a bevel arm 130, with the turntable 120 pivotably coupled to the base 125 about a second, vertical miter axis 135 for performing a first angled cut (e.g., a miter cut) on a work piece. The turntable 120 and the base 125 collectively include a horizontal workpiece support surface 140 configured to support a workpiece on the base assembly 105.

The saw unit 110 is slidably coupled to the bevel arm 130 in a direction perpendicular to the chopping axis 115 (i.e., in a fore-aft direction) by guide rails 145 with both the saw unit 110 and the bevel arm 130 pivotable with the turntable 120 about the miter axis 135 relative to the base 125. The saw unit 110 and the bevel arm 130 are also pivotably coupled to the turntable 120 about a third, horizontal bevel axis 150 for performing a second angled cut (e.g., a bevel cut) on the work piece. In the illustrated embodiment, the saw unit 110 can only pivot to one side of the miter saw 100 about the bevel axis 150 (e.g., from a 0 degree bevel angle to about a 45 degree left bevel angle). In other embodiments, the saw unit 110 can pivot to both sides of the miter saw 100 about the bevel axis 150 (e.g., from the 0 degree bevel angle to the 45 degree left bevel angle and from the 0 degree bevel angle to about a 45 degree right bevel angle).

The illustrated saw unit 110 includes a saw blade 155, a motor 160, and a handle 165 with the handle 165 operable to pivot the saw unit 110 about the chopping axis 115 into a kerf 170 of the turntable 120. In the illustrated embodiment of the miter saw 100, the saw unit 110 also includes a power cord 175 electrically coupled to the motor 160 to provide power to the motor 160 from a power supply (e.g., a standard electrical outlet). In other embodiments of the miter saw 100, the motor 160 can be powered by a power tool battery pack. In some embodiments, the motor 160 can be a brushless direct current (i.e., DC) motor, a brushed DC motor, or an alternating current (i.e., AC) motor.

The illustrated base assembly 105 also includes a fence assembly 180 having a first fence 185, a second fence 190, an arcuate member 195 connecting the first and second fences 185, 190 together, and a moveable fence 200 moveably coupled to the first fence 185. Specifically, the first and second fences 185, 190 are fixedly coupled to the base 125 so that the saw unit 110 moves relative to the first and second fences 185, 190 as the turntable 120 pivots about the miter axis 135. As best shown FIG. 1, the first and second fences 185, 190 each include a vertical wall 205 defining a vertical workpiece support surface 210 with the vertical workpiece support surfaces 210 being coplanar. The workpiece support surfaces 210 are also substantially perpendicular to the horizontal workpiece support surface 140 of the turntable 120 and the base 125.

With continued reference to FIGS. 1 and 2, the illustrated first and second fences 185, 190 also include fence apertures 215 (fence apertures 215*a*, 215*b*, 215*c*, 215*d*) extending through the vertical walls 205 each configured to receive a fastener so that each fastener is generally collinear with a central axis 218 (FIGS. 6 and 8) of the corresponding fence aperture 215 to secure a "zero-clearance fence" to the base assembly 105. Each central axis 218 is substantially transverse to the miter axis 135. The "zero-clearance fence" is a temporary fence selectively coupled to the first and second fences 185, 190 to extend across a gap 220 defined between the first and second fences 185, 190 (the kerf 170 of the turntable 120 is located within the gap 220). As such, the "zero-clearance fence" is operable to provide a more precise cut of the workpiece by the saw blade 155 by inhibiting the workpiece from moving/flexing into the gap 220 toward the bevel arm 130 during a cutting operation.

Figure 3:
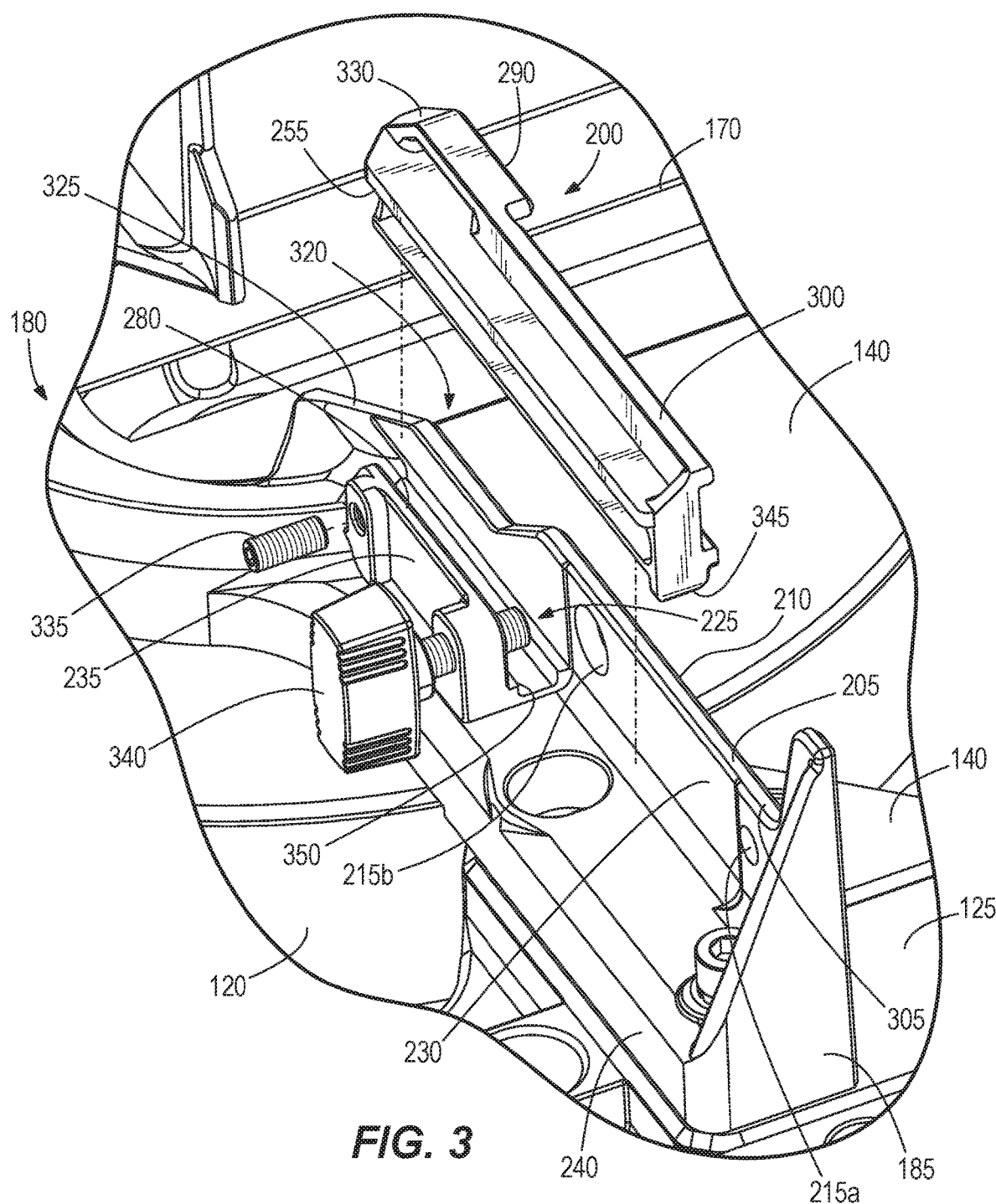
FIG. 3 is a top perspective view of a portion of the miter saw of FIG. 1, illustrating a portion of the fence assembly with a moveable fence exploded from a fixed fence.

With reference to FIG. 3, the illustrated first fence 185 includes a channel 225 defined between a rear surface 230 of the vertical wall 205, which is opposite the vertical workpiece support surface 210 of the first fence vertical wall 205, and a post 235 extending upwardly from a base 240 of the first fence 185. The illustrated channel 225 is sized to receive a lower portion 245 of the moveable fence 200 (FIG. 4) such that the moveable fence 200 is axially slidable within the channel 225 in a lateral direction that is substantially transverse to the miter axis 135.

Figure 7:
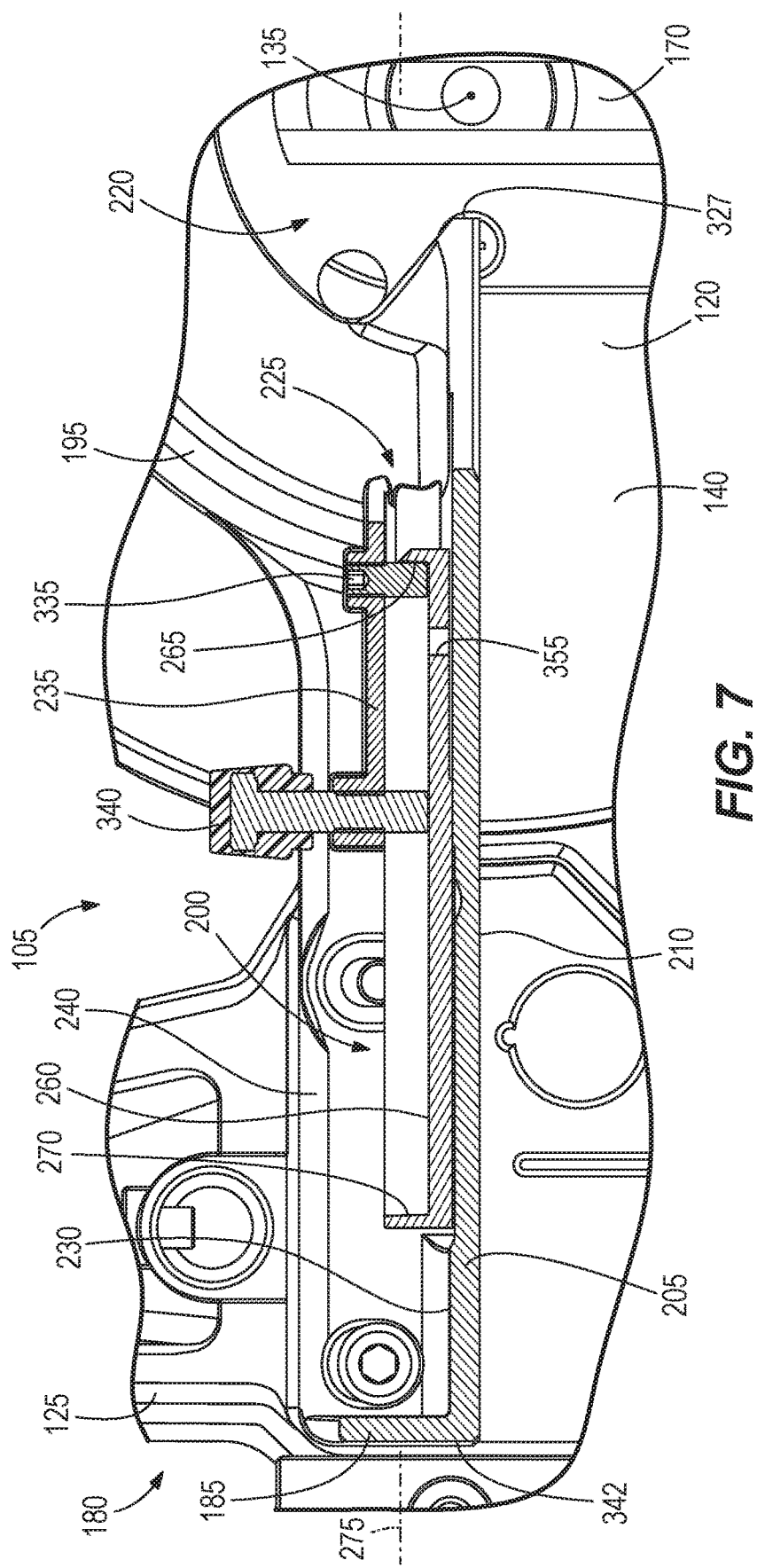
FIG. 7 is a cross-sectional view of a portion of the miter saw taken along line 7-7 of FIG. 6 with the moveable fence in the retracted position.
Figure 9:
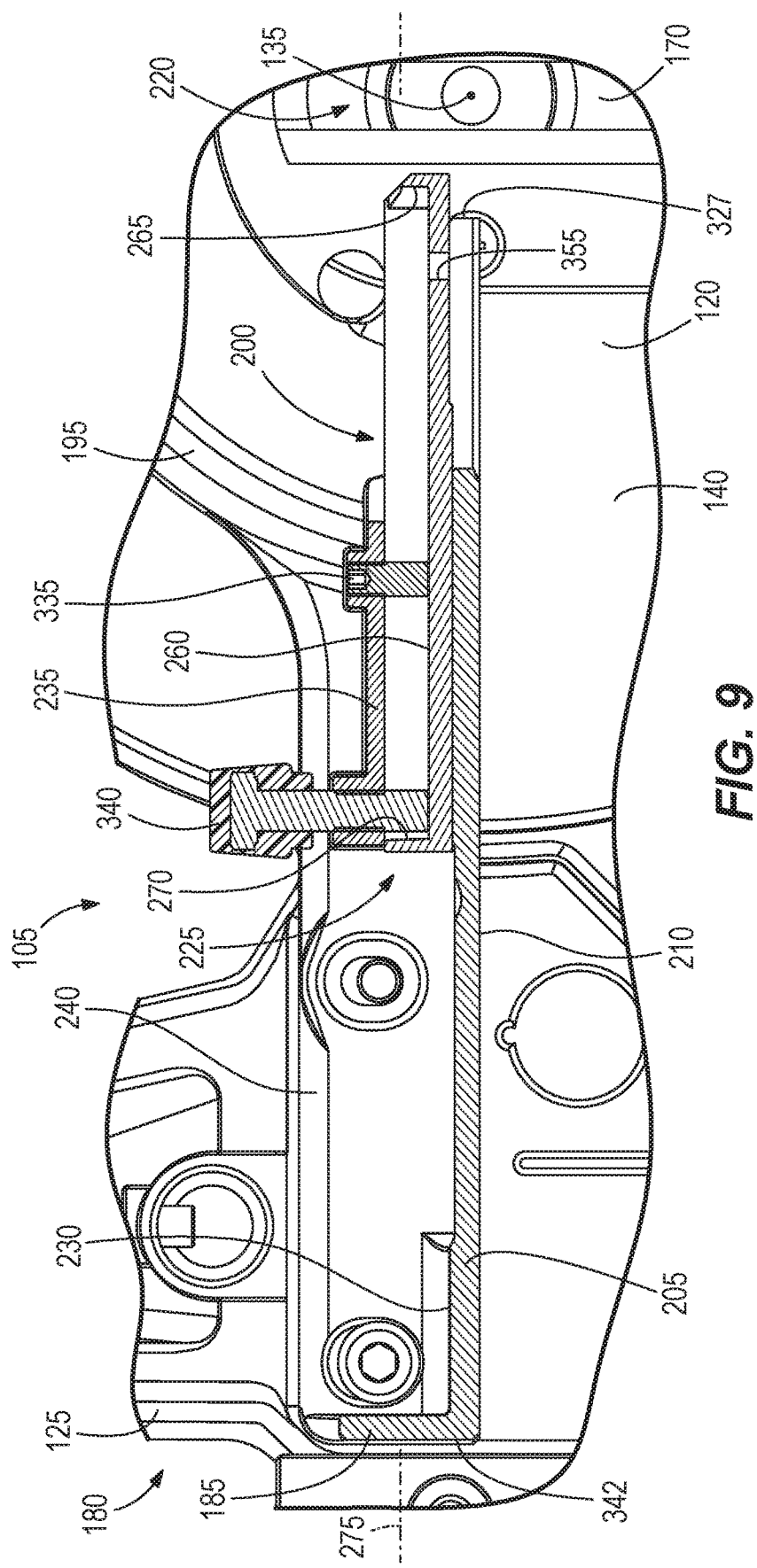
FIG. 9 is a cross-sectional view of a portion of the miter saw taken along line 9-9 of FIG. 8 with the moveable fence in the extended position.

As best shown in FIG. 4, a rear side 250 of the moveable fence 200 includes a rail 255 and a groove 260 positioned below the rail 255. The illustrated rail 255 extends away from the first fence vertical wall 205 and spans from one end 265 of the groove 260 to another end 270 of the groove 260 along a longitudinal axis 275 of the moveable fence 200. The illustrated groove 260 includes a consistent depth between the ends 265, 270 (FIGS. 7 and 9). The rail 255 slides on a top surface 280 of the post 235 to guide the moveable fence 200 within the channel 225.

Figure 6:
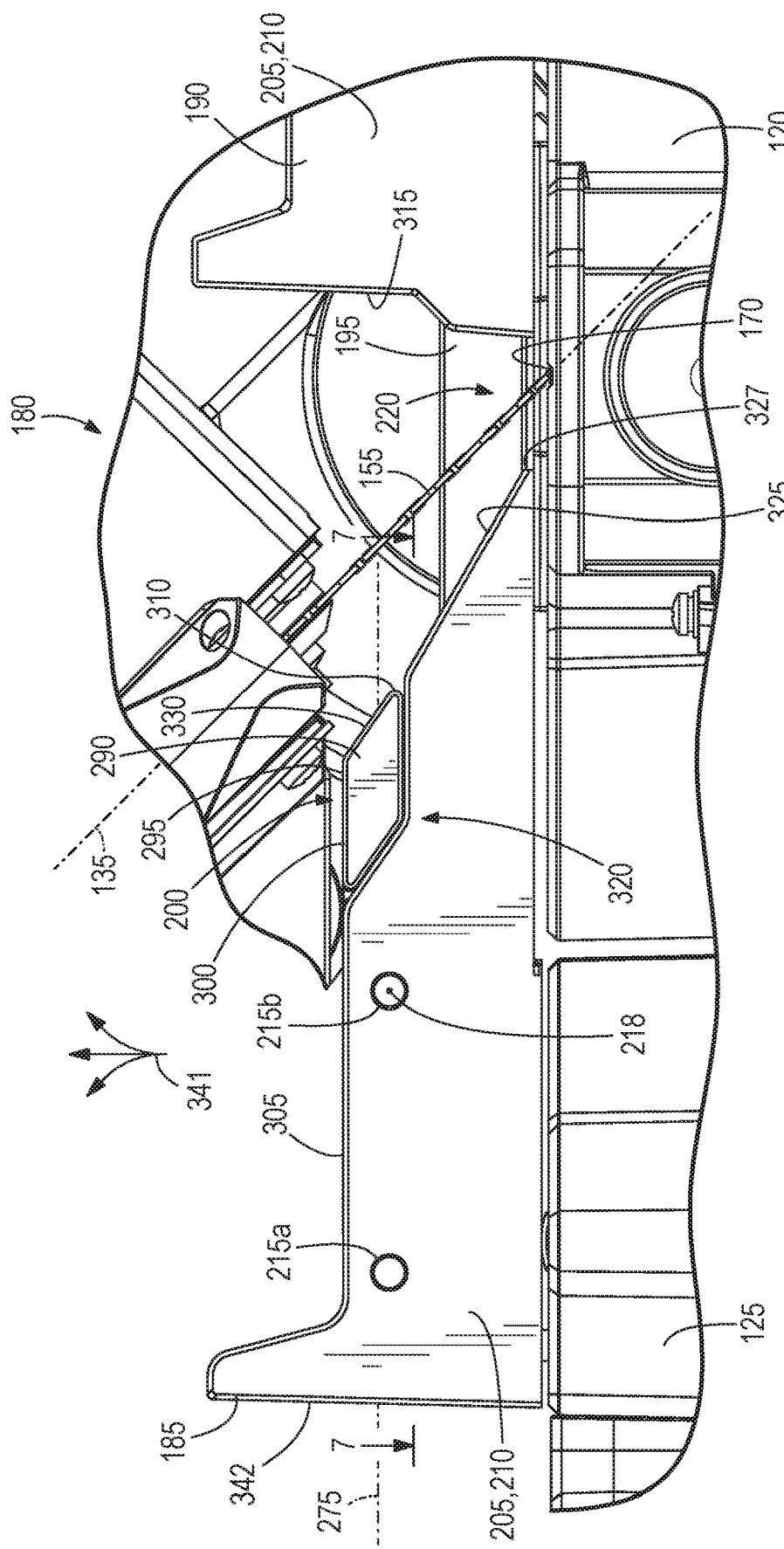
FIG. 6 is a front view of a portion of the miter saw of FIG. 1 with the moveable fence in a retracted position.

With reference to FIG. 5, a front side 285 of the moveable fence 200 includes a protrusion 290 having a parallelogram shape and extending toward the first fence vertical wall 205 and defining a surface 295 substantially coplanar with the second workpiece support surface 210 of the first fence vertical wall 205. In other words, the protrusion 290 extends forwardly from a front surface 298 of the moveable fence 200. In other embodiments, the protrusion 290 can have a different shape than a parallelogram (e.g., the protrusion 290 can have a circular, cuboid, triangular, oval, etc. shape). The illustrated moveable fence 200 is coupled to the first fence 185 such that a portion (e.g., the lower portion 245 and a portion of the front surface 298) of the moveable fence 200 is positioned within the channel 225 behind the rear surface 230 of the first fence 185, and another portion (e.g., the protrusion 290) of the moveable fence 200 is positioned forward of the rear surface 230 to be substantially coplanar with the vertical workpiece support surface 210. In the illustrated embodiment, a top edge 300 of the moveable fence 200 is positioned above a top edge 305 of the first fence 185 in a direction parallel to the miter axis 135 (FIG. 6). In other embodiments, the top edge 300 of the moveable fence 200 can be substantially coextensive with the top edge 305 of the first fence 185 or positioned below the top edge 305 of the first fence 185 in the direction parallel to the miter axis 135.

With reference to FIGS. 6-9, the moveable fence 200 is moveable relative to the first and second fences 185, 190 in at least two positions to adjust a distance between a tip 310 of the moveable fence 200 and an edge 315 of the second fence 190 in a direction perpendicular to the miter axis 135. To locate the moveable fence 200 within a first or retracted position (FIGS. 6 and 7), the moveable fence 200 is slid within the channel 225 so that the protrusion 290 of the moveable fence 200 interfaces or is nested within a notched portion 320 of the first fence 185, with the notched portion 320 positioned between the top edge 305 and an oblique surface 325 (relative to the miter axis 135) of the first fence 185. The protrusion 290 is positioned relative to the oblique surface 325 such that a side surface 330 of the protrusion 290, which generally aligns with the oblique surface 325 when the moveable fence 200 is in the retracted position, is located completely above the oblique surface 325 in a direction parallel to the miter axis 135. Also, when the moveable fence 200 is in the retracted position, an end 327 (e.g., an inboard edge) of the first fence 185 is positioned between the tip 310 of the moveable fence 200 and the second fence 190 in a direction perpendicular to the vertical miter axis 135. In addition, the moveable fence 200 is also located within the retracted position by a stud 335 (e.g., a first set screw; FIG. 3) abutting the end 265 of the groove 260 as the moveable fence 200 moves away from the second fence 190. In particular, the stud or retaining member 335 is threaded to the post 235 and received within the groove 260 to provide a stop to locate the moveable fence 200 in the retracted position. In some embodiments, engagement between the protrusion 290 of the moveable fence 200 and the notched portion 320 of the first fence 185 can also provide a stop to locate the moveable fence 200 in the retracted position. In the illustrated embodiment, the stud 335 is sized short enough to not engage a bottom surface of the groove 260 so that the stud 335 cannot fix the moveable fence 200 to the first fence 185. In further embodiments, the retaining member 335 can be coupled to the post 235 differently, for example, by a snap-fit connection, etc.

To secure the moveable fence 200 relative to the first fence 185 in the retracted position, a locking member 340 (e.g., a second set screw; FIG. 3), which is threaded to the post 235, is received within the groove 260 of the moveable fence 200 and tightened to engage the bottom surface of the groove 260. As such, the moveable fence 200 is clamped between the post 235 and the rear surface 230 of the first fence vertical wall 205 in the retracted position. In the illustrated embodiment, the locking member 340 is spaced from the stud 335 such that when the stud 335 abuts the end 265 of the moveable fence 200 (i.e., the retracted position), the locking member 340 can only engage a middle portion of the groove 260 between the ends 265, 270. In other words, the stud 335 and the locking member 340 do not extend through the lower portion 245 of the moveable fence 200. With the stud 335 and the locking member 340 received within the groove 260, the moveable fence 200 is substantially restricted from pivoting about one of the stud 335 and the locking member 340 as well as upward axial movement of the moveable fence 200 relative to the first fence 185. In particular, diameters of the stud 335 and the locking member 340 are smaller than a height of the groove 260—measured in a direction substantially parallel to the miter axis 130—allowing some undesired movement (e.g., upward axial movement, pivoting movement, etc.) of the moveable fence 200 relative to the first fence 185. The stud 335 also substantially restricts the protrusion 290 of the moveable fence 200 from riding up on the notched portion 320 toward the top edge 305 of the first fence 185. Accordingly, the locking member 340 and the stud 335 collectively restrict the moveable fence 200 from moving in a direction 341 away from the horizontal workpiece support surfaces 140.

Once the moveable fence 200 is in the retracted position (FIGS. 6 and 7), the saw unit 110 can pivot into an extreme bevel angle (e.g., a 45 degree left bevel angle; FIG. 6). The oblique surface 325 of the first fence 185 and the side surface 330 of the protrusion 290 provide enough clearance for the saw blade 155 in the extreme bevel angle. In addition, the tip 310 of the moveable fence 200 is positioned between the inboard edge 327 of the first fence 185 and an outboard edge 342 of the first fence 185 in a direction substantially perpendicular to the miter axis 135 while the saw blade 155 is in the extreme bevel angle. In some embodiments, the moveable fence 200 is in the retracted position (FIGS. 6 and 7) for the saw unit 110 to pivot into an extreme miter angle (e.g., a 45 degree left miter angle, a 45 degree right miter angle, etc.) As a result, the saw unit 110 can perform a cutting operation on the workpiece at an extreme bevel angle and/or an extreme miter angle.

Figure 8:
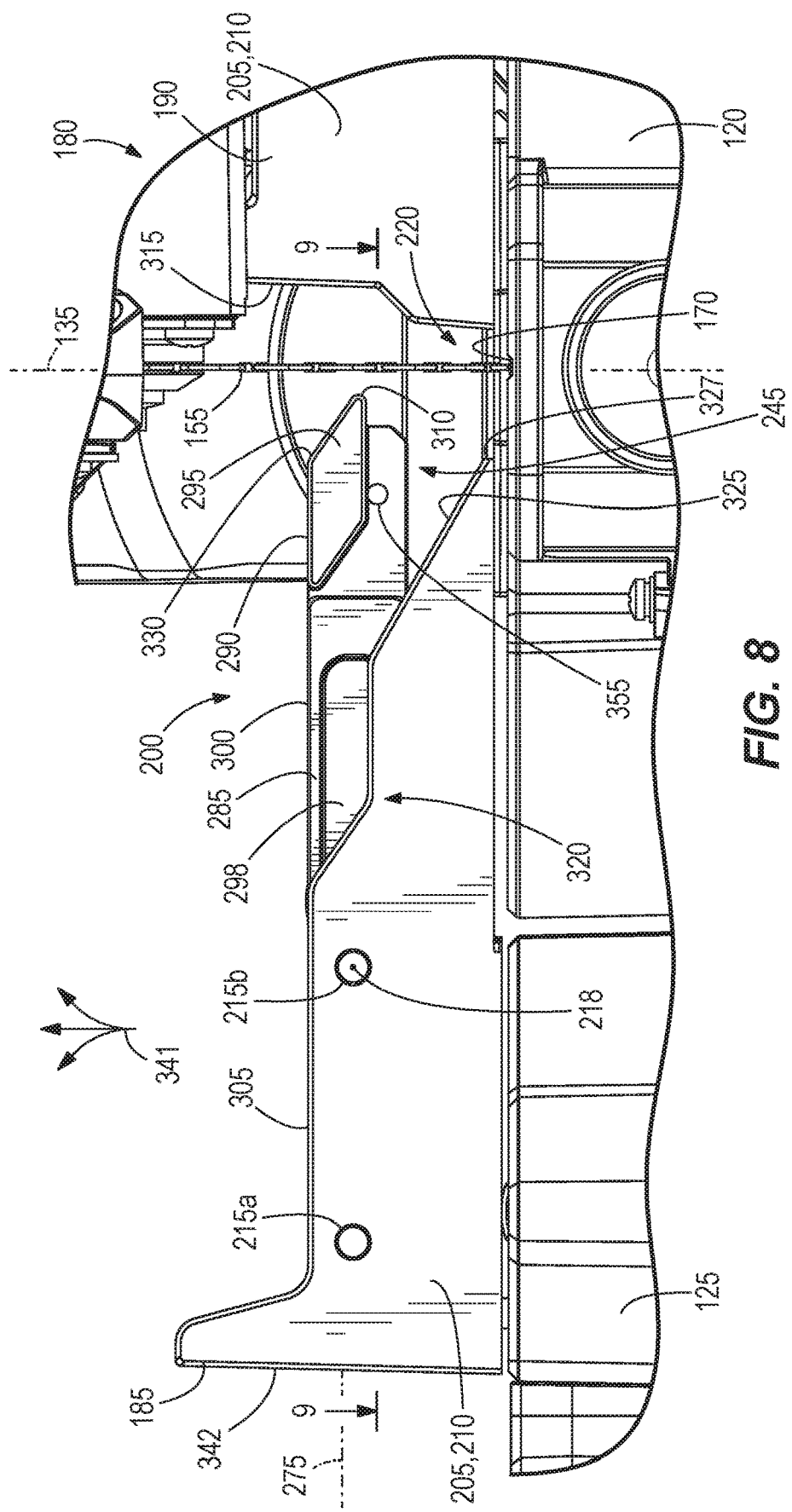
FIG. 8 is a front view of a portion of the miter saw of FIG. 1 with the moveable fence in an extended position.

In some instances where the extreme bevel angle is not desired (e.g., when the saw unit 110 is positioned in a 0 degree bevel angle; FIG. 8), the moveable fence 200 can be slid in a second or extended position (FIG. 8) to position the tip 310 closer to the edge 315 of the second fence 190. In other words, the tip 310 of the moveable fence 200 extends beyond the end 327 of the first fence 185 toward the second fence 190 in a direction perpendicular to the vertical miter axis 135 when the moveable fence 200 is in the extended position. As a result, the gap 220 is reduced and the surface 295 of the protrusion 290 can support the workpiece closer to the saw blade 155 during a cutting operation to provide a more precise cut on the workpiece (e.g., the moveable fence 200 inhibits the workpiece from moving/flexing into the gap 220 similar to the "zero-clearance" fence described above).

To secure the moveable fence 200 in the extended position, the locking member 340 is tightened to engage the lower portion 245 of the moveable fence 200 (FIG. 9). As such, the moveable fence 200 is clamped between the post 235 and the rear surface 230 of the first fence vertical wall 205 in the extended position. The illustrated moveable fence 200 can be positioned anywhere between the retracted position (FIGS. 6 and 7) and the extended position (FIGS. 8 and 9) by tightening the locking member 340 against the lower portion 245 of the moveable fence 200. To inhibit the moveable fence 200 from sliding beyond the extended position and completely out of the channel 225, a tab 345 that extends from the lower portion 245 of the moveable fence 200 (FIGS. 4 and 5) abuts a stop 350 formed as a protrusion on the post 235 (FIG. 3). In other words, engagement between the tab 345 and the stop 350 locates the moveable fence 200 in the extended position. In some embodiments, engagement between the locking member 340 and the end 270 of the moveable member 200 locates the moveable fence 200 in the extended position.

The moveable fence 200 also includes an aperture 355 located within the groove 260 (FIG. 4) that enables the moveable fence 200 to be supported during the manufacturing process of the miter saw 100. For example, a support member is received through the aperture 355 to support the moveable fence 200 during a painting operation of the moveable fence 200 before the moveable fence 200 is coupled to the first fixed fence 185. In other embodiments, the aperture 355 can be positioned at a different location, for example, above the rail 255.

Furthermore, to fasten the "zero-clearance fence" to the base assembly 105, the moveable fence 200 is slid into the extended position to allow access to a rear side of the fence aperture 215b, which is blocked when the moveable fence 200 is in the retracted position. Stated another way, the axis 218 of the fence aperture 215b extends through the moveable fence 200 when the moveable fence 200 is in the retracted position (FIG. 6) but is spaced from (e.g., does not extend through) the moveable fence 200 when the moveable fence 200 is in the extended position (FIG. 8). Also, the post 235 is spaced laterally from the fence aperture 215b so that the axis 218 is also spaced from the post 235. Accordingly, enough clearance is provided behind the first fence 185 for a fastener to extend through the fence aperture 215b to fasten the "zero-clearance fence" to the first fence 185. In some embodiments, the moveable fence 200 can be disconnected from the first fence 185 by removing the stud 335 and the locking member 340 from the post 235 to allow removal of the moveable fence 200 from the channel 225, which can also provide access to the rear side of the fence aperture 215b.

In another embodiment, the stud 335 and the locking member 340 can switch locations on the post 235 so that the locking member 340 is coupled to the post 235 further inboard (closer to the miter axis 135) than the stud 335. In such embodiment, the locking member 340 contacts the end 265 to locate the moveable fence 200 in the retracted position, and the stud 335 contacts the other end 270 to locate the moveable fence 200 in the extended position. In further embodiments, the tab 345 can be omitted such that the stud 335 is engageable with the end 270 of the moveable fence 200 to inhibit the moveable fence 200 from sliding beyond the extended position and completely out of the channel 225.

Figure 10:
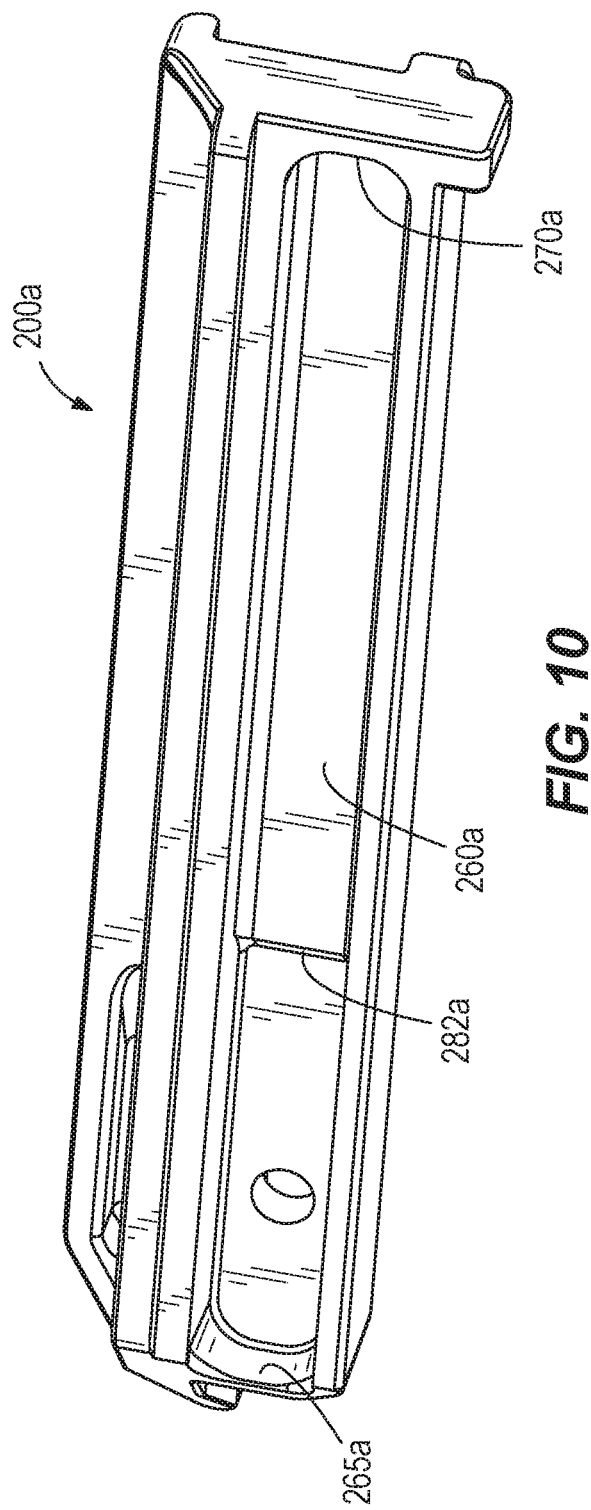
FIG. 10 is a rear perspective view of a moveable fence according to another embodiment of the invention.

FIG. 10 illustrates a moveable fence 200a according to another embodiment. The moveable fence 200a is similar to the moveable fence 200; therefore, like features are designated with like references numerals plus the letter "a." At least some differences and/or at least some similarities between the moveable fences 200, 200a will be discussed in detail below. In addition, components or features described with respect to the moveable fence 200 are equally applicable to the moveable fence 200a.

A groove 260a of the moveable fence 200a includes a cut out portion between an inboard end 265a of the groove 260a and a step 282a of the groove 260a that, for example, reduces weight of the moveable fence 200a. In other words, the groove 260a includes at least two depths separated by the step 282a between the inboard end 265a and an outboard end 270a of the groove 260a. Accordingly, when the moveable fence 200a is in a retracted position (FIGS. 6 and 7), the stud 335 abuts the inboard end 265a of the moveable fence 200a and the locking member 340 engages a portion of the groove 260a positioned between the step 282a and the outboard end 270a of the moveable fence 200a. When the moveable fence 200a is in an extended position (FIGS. 8 and 9), the locking member 340 abuts the outboard end 270a and the stud 335 is axially positioned between the step 282a and the outboard end 270a. In both the retracted and extended positions of the moveable fence 200a, the stud 335 does not contact the bottom surface of the groove 260a as to allow free axial movement of the moveable fence 200a until the locking member 340 clamps the moveable fence 200a to the first fence 185.

Although the invention has been described in detail with reference to certain preferred embodiments, variations and modifications exist within the scope and spirit of one or more independent aspects of the invention as described. Various features and advantages of the disclosure are set forth in the following claims.

The invention claimed is:

1. A miter saw comprising:
   a base;
   a turntable pivotably coupled to the base about a vertical miter axis, the turntable and the base including horizontal workpiece support surfaces configured to support a workpiece on the miter saw; and
   a fence assembly including
      a first fence fixedly coupled to the base, the first fence including a wall having a vertical workpiece support surface,
      a moveable fence including a lower portion slidably received within a channel at least partially defined by the first fence, the moveable fence including a protrusion having a surface coplanar with the vertical workpiece support surface, the surface of the moveable fence and the vertical workpiece support surface configured to abut the workpiece supported on the horizontal workpiece support surfaces,
      a locking member coupled to the first fence, the locking member extending into a groove defined by the lower portion of the moveable fence, the locking member configured to engage the lower portion of the moveable fence to selectively lock the moveable fence between a retracted position and an extended position relative to the first fence, and
      a retaining member coupled to the first fence and extending into the groove of the moveable fence, the retaining member engageable with one end of the groove to locate the moveable fence in the retracted position, wherein the locking member and the retaining member collectively restrict the moveable fence from moving in a direction away from the horizontal workpiece support surfaces.

2. The miter saw of claim 1, wherein the moveable fence includes a top edge coextensive with or positioned below a top edge of the first fence in a direction parallel to the vertical miter axis.

3. The miter saw of claim 1, wherein the first fence includes a post extending from a base of the first fence, and wherein the channel is defined between the post and a rear surface of the wall.

4. The miter saw of claim 3, wherein the locking member is threaded to the post.

5. The miter saw of claim 3, wherein the retaining member is a stud that is threaded to the post.

6. The miter saw of claim 1, wherein the moveable fence includes a tab extending from the lower portion, and wherein the tab engages a stop formed by the first fence to locate the moveable fence in the extended position and to inhibit the moveable fence from moving beyond the extended position.

7. The miter saw of claim 3, wherein the moveable fence includes a rail extending opposite the protrusion, and wherein the rail slidably engages a top surface of the post to guide the moveable fence within the channel.

8. The miter saw of claim 1, wherein the wall of the first fence includes a notched portion, and wherein the protrusion of the moveable fence is nested within the notched portion when the moveable fence is located in the retracted position.

9. The miter saw of claim 1, wherein the fence assembly includes a second fence fixedly coupled to the base.

10. The miter saw of claim 9, wherein a tip of the moveable fence extends beyond an end of the first fence toward the second fence in a direction perpendicular to the vertical miter axis when the moveable fence is in the extended position.

11. The miter saw of claim 10, wherein the end of the first fence is positioned between the tip of the moveable fence and the second fence in the direction perpendicular to the vertical miter axis when the moveable fence is in the retracted position.

12. The miter saw of claim 1, wherein the wall of the first fence includes an aperture through by which to attach a sacrificial workpiece for use as a zero-clearance fence.

13. The miter saw of claim 12, wherein the first fence includes a post extending from a base of the first fence, and wherein the locking member and the retaining member are coupled to the post, and wherein a central axis of the aperture transverse to the miter axis is spaced from the post.

14. The miter saw of claim 13, wherein the axis extends through the moveable fence when the moveable fence is in the retracted position.

15. The miter saw of claim 14, wherein the axis is spaced from the moveable fence when the moveable fence is in the extended position.

16. The miter saw of claim 1, further comprising a saw unit including a saw blade driven by a motor, and wherein the saw unit is slidably coupled to a bevel arm by guide rails, and wherein the bevel arm is pivotably coupled to the turntable about a horizontal bevel axis oriented perpendicular to the vertical miter axis.

17. The miter saw of claim 16, wherein the saw unit is configured to move about the horizontal bevel axis into a maximum bevel angle relative to the turntable, and wherein a tip of the moveable fence is positioned between an outboard edge of the first fence and an inboard edge of the first fence in a direction perpendicular to the vertical miter axis while the saw unit is in the maximum bevel angle.

18. The miter saw of claim 1, wherein a step is positioned within the groove between opposing ends of the groove, and wherein the retaining member is sized as to not engage the step while the moveable fence moves between the extended position and the retracted position.

19. The miter saw of claim 1, wherein the groove includes a consistent depth between opposing ends of the groove.

20. The miter saw of claim 1, wherein the moveable fence and the first fence each includes an outboard edge relative to the vertical miter axis, and wherein the outboard edge of the moveable fence is positioned inboard relative to the outboard edge of the first fence when the moveable fence is in the retracted position.

* * * * *